Patented Mar. 21, 1950

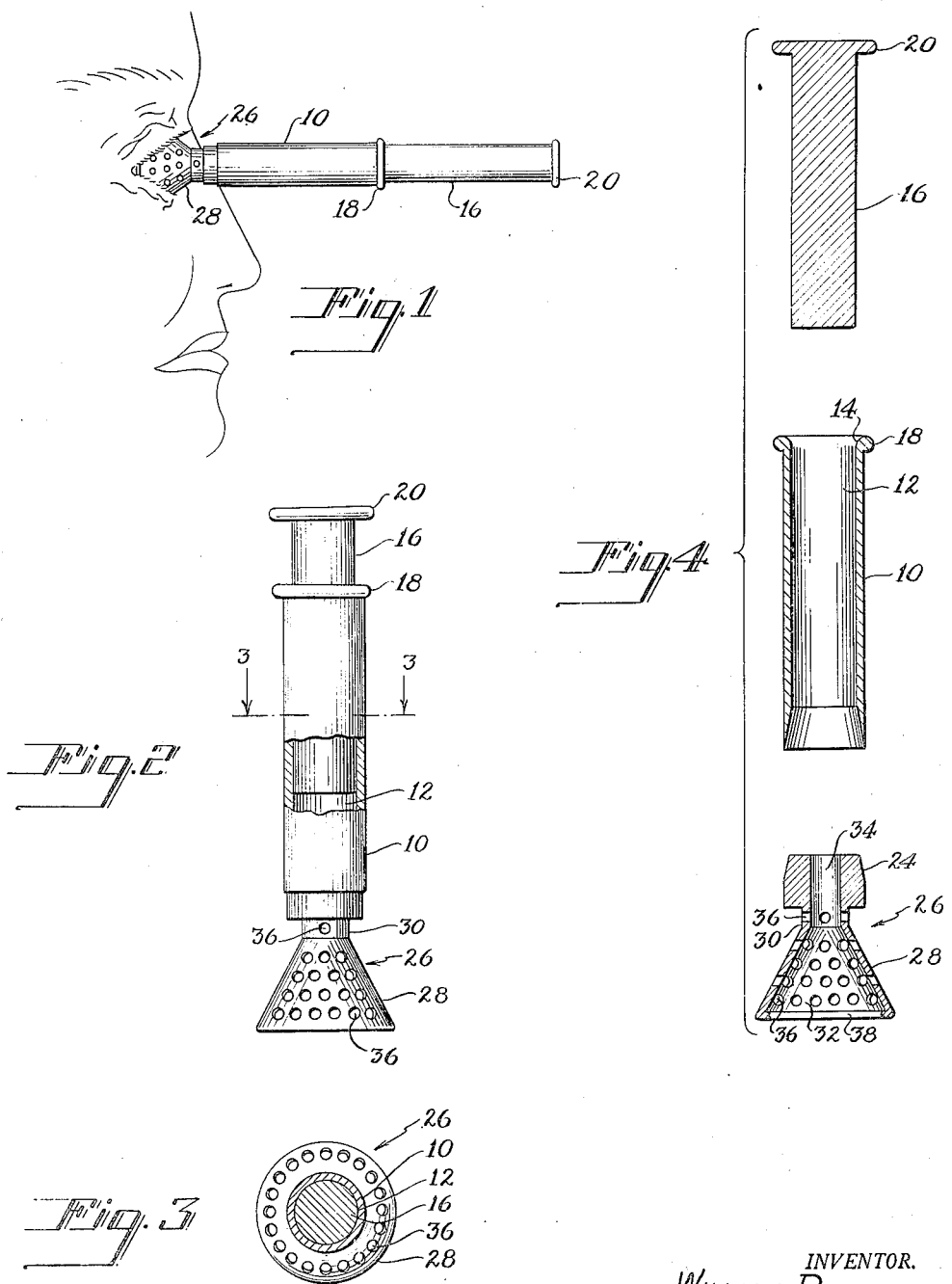

2,501,190

UNITED STATES PATENT OFFICE 2,501,190

EYE MOLDING APPARATUS FOR CONTACT LENSES

William Policoff, Wilkes-Barre, Pa.

Application December 3, 1947, Serial No. 789,393

6 Claims. (Cl. 18—5.1)

This invention relates to apparatus for molding eye glasses of the contact lens type.

An object of the invention is to provide an improved form of molding device whereby molding material may be applied to the eyeball to be molded exactly according to the contour thereof.

Another object of the invention is to provide a contact lens eye moulding apparatus including a hollow housing adapted to contain a quantity of molding material, and carrying a novel discharge cup adapted to overlie the eyeball and to receive under the influence of pressure from a plunger, some of the molding material so as to bring the material into contact with the outer surface of the eyeball to assume the contour thereof.

A further object of the invention is to provide a contact lens eye moulding apparatus including an improved form of perforated cone which overlies the eyeball during the molding process, holding the molding material thereagainst, the cone being so constructed and arranged as to permit making of a cast in which the molding material remains thick enough to assure a perfect cast.

Still another object of the invention is to provide a contact lens moulding apparatus of the type described, which is simple in design, easily assembled and taken apart, and which may be manufactured at low cost, for producing casts of high precision.

Other objects and advantages of the invention will become apparent from the following description of a preferred embodiment thereof as illustrated in the accompanying drawings, and in which, Fig. 1 is a side elevation showing my improved contact lens moulding apparatus in engagement with the eyeball of the patient;

Fig. 2 is an elevational view of the contact lens moulding apparatus shown in Fig. 1;

Fig. 3 is a transverse sectional plan view taken on line 3—3 of Fig. 2; and

Fig. 4 is an exploded sectional elevational view of the several parts comprising the assembled device of Fig. 2.

In the manufacture of contact lenses, it is necessary to first take an exact casting or mold of the external contour of the eyeball of the person for whom the lenses are to be made. Having thus determined the exact contour of the eyeball, the cast may then be employed in producing the finished contact lens which will hence fit perfectly upon the eyeball without irritation thereof or optical aberration in the resultant vision. The present application discloses means for making an exact cast of the eyeball with a considerable and enhanced degree of perfection.

In order to understand clearly the nature of the invention and the best means for carrying it out, reference may now be had to the drawings, in which like numerals denote similar parts throughout the several views.

As shown, my apparatus includes a hollow tubular housing or body 10 having an axial bore 12 extending therethrough, as best seen in Figs. 3 and 4. The bore 12 is adapted to receive a quantity of molding material of a type well known in the art for use in making a cast of the eyeball. The upper end of the bore 12 is slightly flared outwardly as seen best in Fig. 4, at 14, to receive the plunger 16, an annular bead 18 being formed in the upper edge of the housing 10.

The outside diameter of the plunger 16 is such as to slide easily inside the housing bore 12, yet snug enough to block leakage of the molding material between the plunger and the inner surface of the bore 12. An upper annular bead 20 is formed on the upper end of the plunger 16, serving as a convenient platform for the thumb of the operator during the application of pressure in the casting operation.

The lower end portion of the axial bore 12 is flared divergently downward, as shown best at 22 in Fig. 4, to produce a conical surface or socket for the reception of the frusto-conical upper extension 24 of the discharge cone 26. From Figs. 2 and 4, it will be seen that the discharge cone 26 includes the upper extension 24 and the lower outwardly flared frusto-conical extension 28 which are interconnected by means of the neck 30.

The lower extension 24 is hollow, having a conical discharge mouth or bell 32 which merges at its upper end with the axial bore 34 extending through both the upper extension 24 and the neck 30. It will be observed that both the neck 30 and the lower extension 28 are provided with a number of apertures 36 extending through their walls. The discharge opening of the cone bell 32 is provided with an inwardly extending annular flange or bead 38, shown best in Fig. 4, the effect of the bead 38 being to reduce the inside diameter of the opening in the lower end of the cone 26, through which the molding material is extruded against the surface of the eyeball under the influence of pressure from the plunger 16.

The tube 10 and the plunger 16 may be made of any size desired. It is only necessary that the tube be large enough to hold an adequate supply of molding material. The eye cup 26 is made in any desired sizes, controlled by several factors. For example, the taper of the perforated cone 28 must be such that it adequately clears the corneal and scleral portion of the eye. In addition, the diameter at the bevel of the perforated cone should be great enough to permit the largest possible cast to be made of any particular eye. These cones may be made in a range of sizes, to more readily match the varying apertures found in the eyes of different patients.

It is important that the tapers of the plug 24 and socket 22 match to permit them to frictionally engage each other with sufficient security to prevent them from being forced apart upon pressure exerted by the plunger upon the molding material, yet to permit them to be readily coupled and uncoupled when needed.

It will be observed that when the apparatus is positioned as shown in Fig. 1, with the cone 28 overlying the eyeball, and the eyelids overlying the outer surface of the cone, the eye having been previously anesthetized, the annular ridge or bead 38 prevents too great outward spreading of the molding material and thus permits the making of a cast of the eyeball in which the molding material remains thick enough to assure of a perfect cast of the contour of the eyeball.

The various parts of the apparatus may be made of any suitable material such as plastic or other light substance, and is easily disassembled for cleaning, for filling with molding material, and for changing the size of the eye cone 26 which is determined by the eye of the patient.

Although I have described a preferred embodiment of my invention in specific terms, it is to be understood that various changes may be made in size, shape, materials and arrangement without departing from the spirit and scope of the invention as claimed.

I claim:

1. A device for making a cast of the eyeball, comprising a hollow housing, adapted to receive a quantity of molding material, a removable plunger extending into said housing, and discharge means including a hollow eye cone having an inlet opening communicating with the interior of said housing and adapted to receive therefrom a quantity of said molding material under the influence of said plunger, said eye cone having a discharge outlet adapted to overlie the eyeball of a patient and to guide thereagainst, said molding material, whereby a cast of the eyeball contour may be made, said eye cone being provided with a plurality of apertures formed in its walls and having on its discharge outlet an integral inwardly extending annular flange adapted to guide molding material flowing against the eyeball surface, whereby a substantially thick layer of molding material is supported against the eyeball to assure a perfect cast.

2. A device for making a cast of the eyeball, comprising a hollow tubular housing having a bore extending therethrough and open at both ends, a plunger slidable in said bore, said bore having a discharge outlet, a hollow eye cone having an inlet opening engageable with said discharge outlet of said bore and adapted to receive from said bore a quantity of molding material contained therein, under the influence of pressure of said plunger, said eye cone having a discharge outlet opening adapted to overlie the eyeball of the patient and to hold said molding material thereagainst during the molding process, said discharge opening being slightly smaller in diameter than the largest diameter of said cone, for the purposes set forth.

3. The construction according to claim 2, characterized further in that said eye cone is provided with a plurality of apertures formed in its walls.

4. The construction according to claim 2, characterized further in that the outlet of said tubular housing bore is conical to form a seat, and said eye cone has an upper extension having a frusto-conical surface adapted to engage securely frictionally with said seat to hold the eye cone and the housing together during the molding process.

5. The construction according to claim 2, characterized further in that the outlet of said tubular housing bore is conical to form a seat, said eye cone has an upper extension having a frusto-conical surface adapted to engage securely and frictionally with said seat to hold the eye cone and the housing together during the molding process, and in which said eye cone has a neck connecting it with said upper extension, both said neck and said eye cone apart from said upper extension, being perforated.

6. An eye cone for use in contact lens casting devices, comprising an upwardly extending plug adapted to engage with the discharge end of the tubular housing of the casting device and having an axial bore for communicating with the interior of the tubular housing to receive casting material therefrom, a neck integral with the lower end of said plug and having an axial bore communicating with that of the plug, and a hollow conical cone body adapted to overlie the eyeball of the patient and to receive and guide against the eyeball casting material received from the said housing through said plug and neck, said cone body being perforated, and an inwardly extending annular bead formed integrally with the discharge outlet of said hollow cone body and adapted to form a relatively thick eye cast.

WILLIAM POLICOFF.

REFERENCES CITED

The following references are of record in the file of this patent:

UNITED STATES PATENTS

| Number | Name | Date |
| --- | --- | --- |
| 2,370,389 | Bessin et al. | Feb. 27, 1945 |